US007676831B2

(12) United States Patent
Britton et al.

(10) Patent No.: US 7,676,831 B2
(45) Date of Patent: Mar. 9, 2010

(54) ROLE-BASED ACCESS CONTROL MANAGEMENT FOR MULTIPLE HETEROGENEOUS APPLICATION COMPONENTS

(75) Inventors: Kathryn H. Britton, Chapel Hill, NC (US); Dieter Buehler, Tuebingen (DE); Ching-Yun Chao, Austin, TX (US); Timothy J. Hahn, Cary, NC (US); Anthony J. Nadalin, Austin, TX (US); Nataraj Nagaratnam, Morrisville, NC (US); Yi-Hsiu Wei, Austin, TX (US); ChunHui Yang, Durham, NC (US)

(73) Assignee: International Business Machines Corporation, Armonk, NJ (US)

( * ) Notice: Subject to any disclaimer, the term of this patent is extended or adjusted under 35 U.S.C. 154(b) by 1217 days.

(21) Appl. No.: 11/221,630

(22) Filed: Sep. 8, 2005

(65) Prior Publication Data

US 2007/0056026 A1 Mar. 8, 2007

(51) Int. Cl.
*H04L 9/32* (2006.01)
*H04L 9/00* (2006.01)
*G06F 7/04* (2006.01)

(52) U.S. Cl. ................. 726/5; 726/2; 726/3; 726/4; 726/6; 726/7; 726/27; 726/28; 726/29; 726/30; 713/182

(58) Field of Classification Search .............. 726/5
See application file for complete search history.

(56) References Cited

U.S. PATENT DOCUMENTS

| 6,202,066 B1 | 3/2001 | Barkley et al. |
| 2002/0026592 A1 | 2/2002 | Gavrila et al. |
| 2003/0005117 A1 | 1/2003 | Kang et al. |
| 2003/0144901 A1* | 7/2003 | Coulter et al. ............... 705/11 |

* cited by examiner

*Primary Examiner*—Longbit Chai
(74) *Attorney, Agent, or Firm*—Joseph E. Bracken, Esq.; Steven M. Greenberg, Esq.; Carey, Rodriguez, Greenberg & Paul, LLP

(57) ABSTRACT

Embodiments of the present invention address deficiencies of the art in respect to access control and provide a method, system and computer program product for access control management for a collection of heterogeneous application components. In a first embodiment, a data processing system for role-based access control management for multiple heterogeneous application components can include at least one business role descriptor associating a business role with multiple, different application roles for corresponding, disparate application components. The system also can include at least one access policy associating a user with the business role. Finally, the system can include policy deployment logic include program code enabled to process the access policy to assign the user to the different application roles in the disparate application components.

11 Claims, 3 Drawing Sheets

ROLE-BASED ACCESS CONTROL MANAGEMENT FOR MULTIPLE HETEROGENEOUS APPLICATION COMPONENTS

BACKGROUND OF THE INVENTION

1. Field of the Invention

The present invention relates to the concurrent display of multiple, heterogeneous application components and more particularly to access control among multiple, heterogeneous application components.

2. Description of the Related Art

Access control relates to the moderation and limitation of access rights to resources in a computing system. Resources can range from documents to application logic and access rights can range from read-only access to full read, write and execute access. Oftentimes, access control can vary from user to user depending upon the trustworthiness of the user. Those having a higher level of trust are granted access permissions associated with a high degree of access, while those having a lower level of trust are granted only an amount of access permission required to achieve a specific objective. In this way, the exposure of the security and integrity of the underlying resources can be minimized.

Access control for an application having only a limited number of users can be relatively manageable. For each individual user, a requisite level of access can be determined subjectively, and corresponding access rights can be assigned to the user. For an application which involves a vast number of often unpredictable individual users, access control can be unmanageable. Where the requisite access rights change for individual users in the latter scenario, access control can be a disastrous proposition! In consequence, the notion of role-based access control evolved.

Role-based access control relates to the assignment of access rights not to an individual user, but to a role fulfilled by one or more individual users. Specifically, it can be more readily determined what level of access rights are to be afforded to a user who fulfills a particular role in an application, such as an administrator, guest, manager, executive and the like. In the concept of workflow, roles can be extended to the type of user responsible for a portion of a business process. In this way, though the identity and roles assumed by any one user can be fluid in nature, the access rights afforded to a user assigned to a specific role can remain relatively static. Consequently, the management of access rights, even for a vast number of users, can be dramatically simplified.

Identifying roles for a particular application can be a simple task so long as the number of roles is limited in nature. The complexity of managing different roles can increase, however, where multiple, different applications are involved. In the past, the singular management of multiple, disparate applications rarely had been an issue. More recently, the popularization of portal and application server technologies have given rise to a new breed of disparate application collections. In a heterogeneous collection of applications, however, similar roles can have disparate identifiers such that one can easily mistake two identical roles of different names as two different roles, or two different roles of identical names in different applications as the same role. Accordingly, the same problems akin to the granular management of access rights for individual users can be present in the heterogeneous application scenario.

BRIEF SUMMARY OF THE INVENTION

Embodiments of the present invention address deficiencies of the art in respect to access control and provide a novel and non-obvious method, system and computer program product for access control management for a collection of heterogeneous application components. In a first embodiment, a data processing system for role-based access control management for multiple heterogeneous application components can include at least one business role descriptor associating a business role with multiple, different application roles for corresponding, disparate application components. The system also can include at least one access policy associating a user with the business role. Finally, the system can include policy deployment logic include program code enabled to process the access policy to assign the user to the different application roles in the disparate application components.

In an aspect of the embodiment, the system further can include an access policy management console configured to create and edit the access policy. Moreover, the system further can include a business role/builder editor configured to create and edit the business role descriptor. The system yet further can include an external authorization server coupled to the disparate application components. Optionally, the policy deployment logic can be disposed in a deployment tool. As another option, the policy deployment logic can be disposed in an aggregate access control manager. As yet another option, the policy deployment logic can be disposed in the external authorization server.

A second embodiment of the invention can include a method for role-based access control management for multiple heterogeneous application components. The method can include identifying a business role assigned to a user within an access control policy and further identifying within a role list of one or more application roles associated with the business role. Finally, the method can include assigning the user to the application roles for each of one or more corresponding, disparate application components.

In one aspect of the second embodiment, the method also can include yet further identifying within the role list a nested business role associated with the business role, and assigning the user to additional application roles associated with the nested business role for each of corresponding, disparate application components. Finally, in another aspect of the second embodiment, the method further can include propagating the application roles for each of corresponding, disparate application components to an external authorization server.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for role-based access control management for multiple heterogeneous application components. In accordance with an embodiment of the present invention, a business role can be created as an aggregation for one or more application roles across multiple, heterogeneous application components. The business role can remain hidden from the application containers for the application components, however, when a user becomes associated with a selected one of the business roles, the user still can be afforded access rights for the application roles assigned to the selected one of the business roles. Moreover, the user can be afforded access rights for the application roles without requiring the manual assignment of the user to each of the application roles assigned to the selected one of the business roles.

Figure 1:
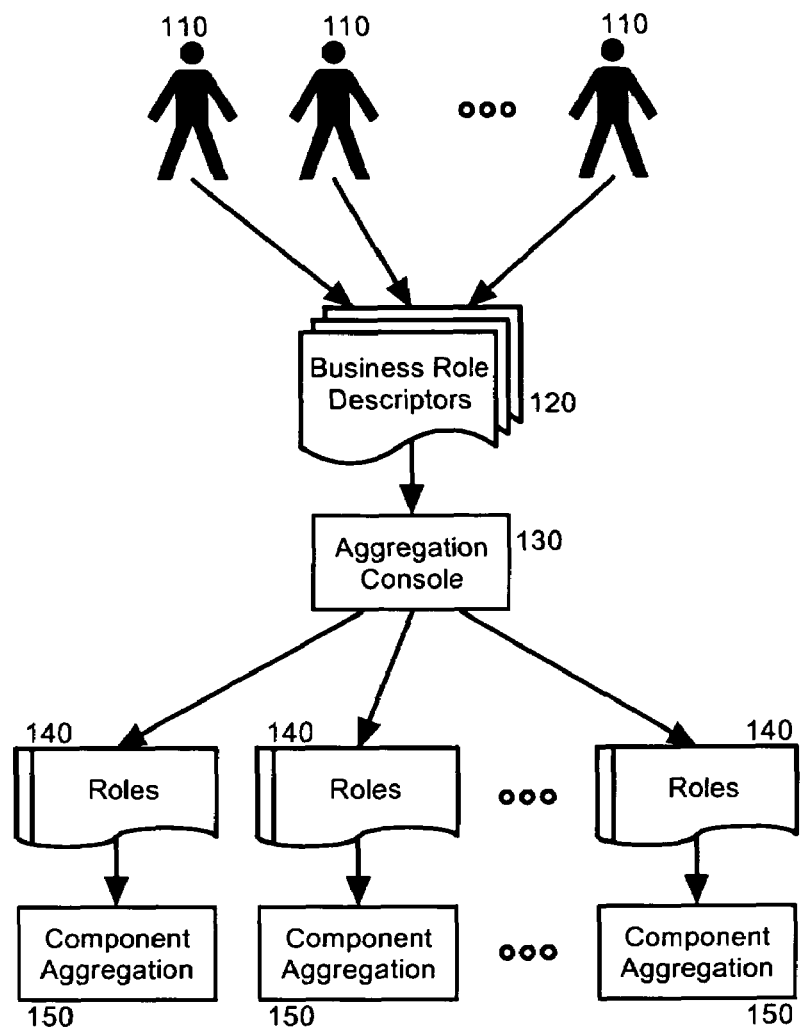
FIG. 1 is a pictorial illustration of a system for role-based access control management for multiple heterogeneous application components.

In more particular illustration, FIG. 1 is a pictorial illustration of a system for role-based access control management for multiple heterogeneous application components. As shown in FIG. 1, the system can include one or more business role descriptors 120 which can associate individual business roles with different application roles 140 for different, disparate application components disposed within different component aggregations 150, as arranged by an aggregation console 130. In addition, the aggregation console 130 can assign different users to different ones of the business role descriptors 120. Thereafter, users 110 assigned to the business roles can be automatically assigned to application roles 140 associated with the business roles in the business role descriptors 120.

In consequence of the foregoing arrangement, usability of enterprise role based access control management can be greatly improved in several ways. First, a solutions integrator can group or organize application roles across application boundaries as desired according to business needs. The resulting business roles can better align to the business solution rather than the specific application. Also, a security administrator can manage security policies directly using business roles without first having to understand the internal construction of the applications. The security administrator further can assign a person or group all of the access rights required for an aggregated application in a single action. Finally, the security administrator only must use a single administrative console, instead of multiple consoles, to manage different types of applications.

Figure 2:
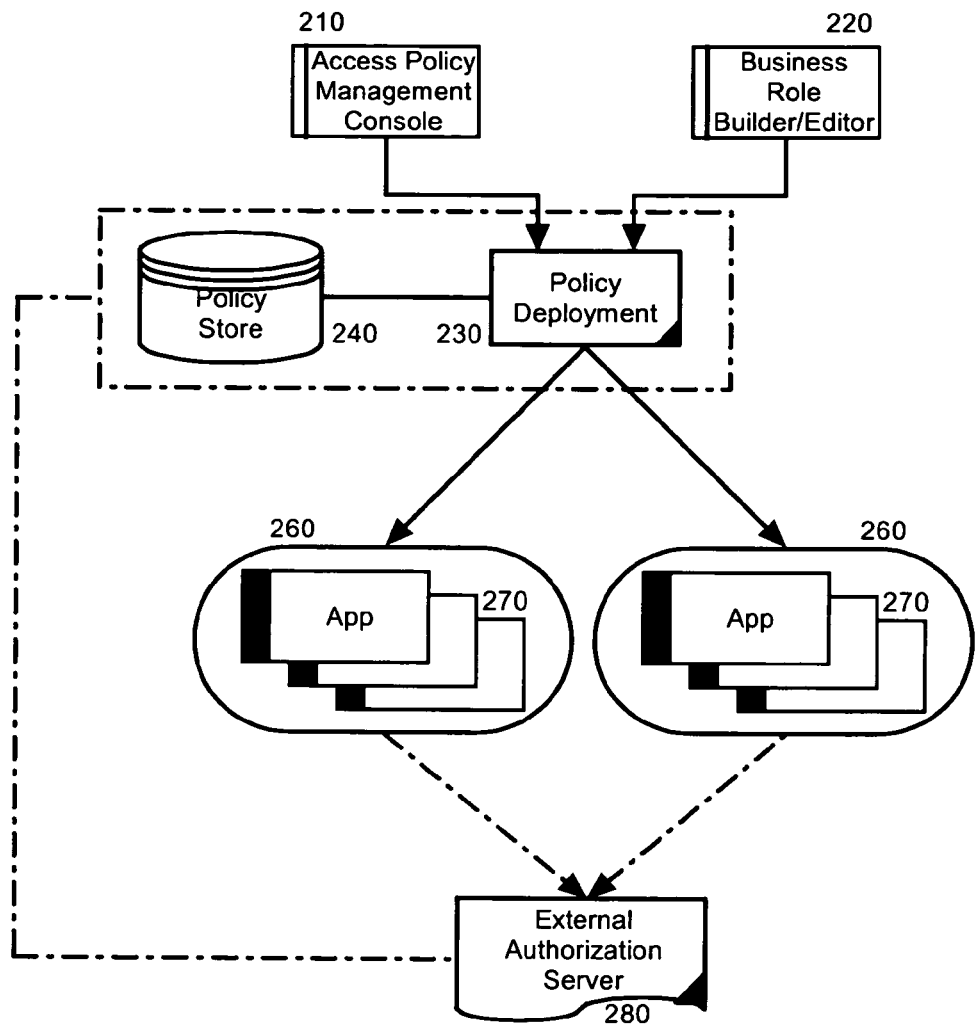
FIG. 2 is a schematic illustration of a system for role-based access control management for multiple heterogeneous application components; and, FIG. 3 is a flow chart illustrating a process for role-based access control management for multiple heterogeneous application components.

In further illustration, FIG. 2 is a schematic illustration of an embodiment of a system for role-based access control management for multiple heterogeneous application components. In the illustrated embodiment, the system can include a business role builder/editor 220. The business role builder/editor 220 can provide an interface for associating different business roles with one or more application component roles in a policy store 240. By comparison, an access policy management console 210 can provide an interface for associating different users with selected ones of the business roles in an access control policy in the policy store 240.

Policy deployment logic 230 can combine the associations directed through the access policy management console 210 and the business role builder/editor 220 in the policy store 240 to create and populate the required application role assignments in the different, disparate application components 270 in different application component containers 260 (only two containers shown for illustrative simplicity). The creation and population of the required application role assignments in the different, disparate application components 270 can result from the updating of one or more associations of user with selected ones of the business roles in the access control policy in the policy store 240.

Figure 3:
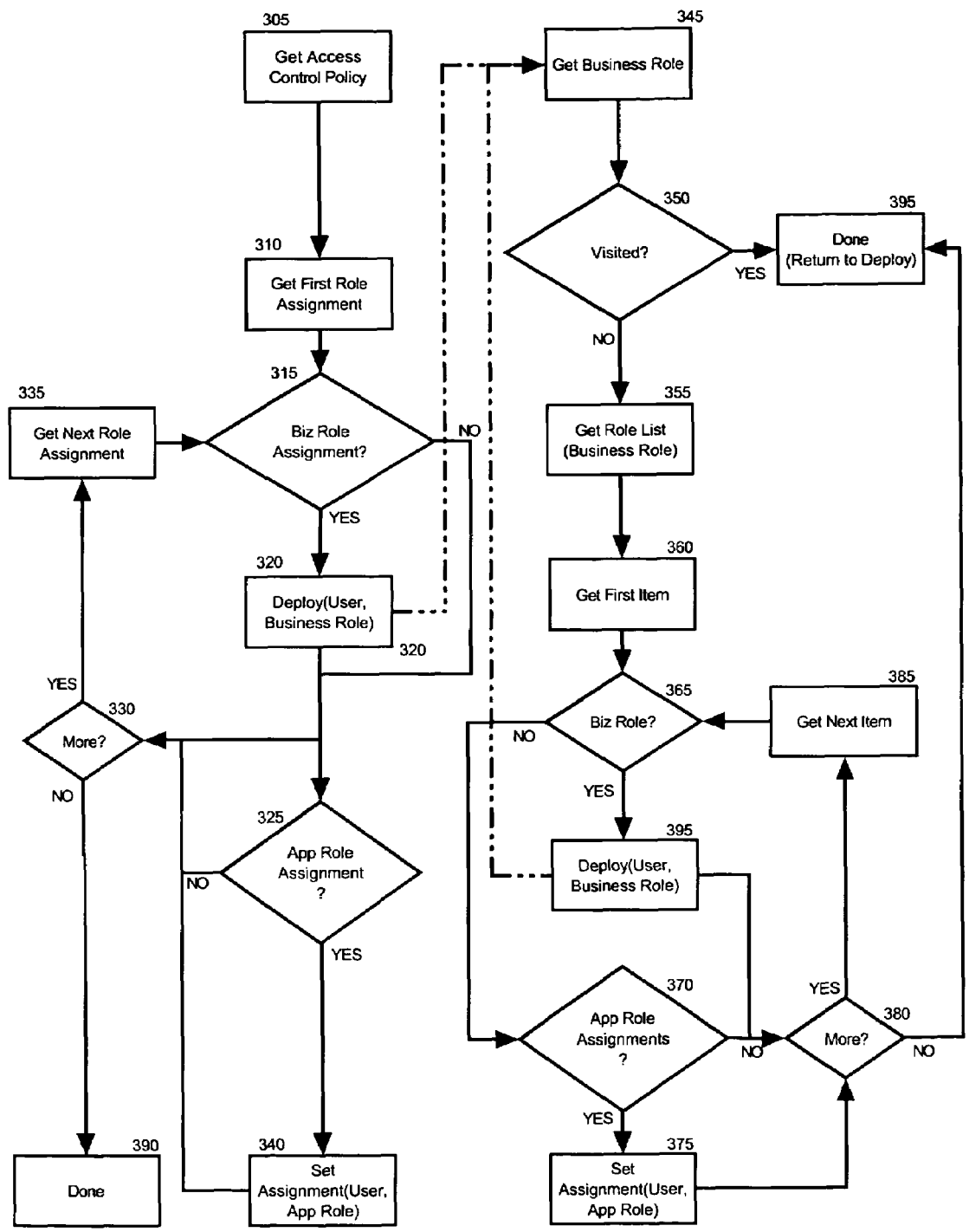

In further illustration of the operation of the policy deployment logic 230, FIG. 3 is a flow chart illustrating a process for role-based access control management for multiple heterogeneous application components. Initially, in block 305, an access control policy can be retrieved for processing. The access control policy can include an assignment of users to business roles wherein each business role represents an aggregation of application roles for multiple, disparate application components. Subsequently, in block 310, a business role assignment can be retrieved from the access control policy. Thereafter, in block 315, at can be determined if the first assignment is a business role assignment. If not, in decision block 325 it can be determined if the first assignment is an application role assignment and if so, any direct application role assignments in the access control policy can be processed in block 340. Otherwise, if the first assignment is a business role assignment, in block 320 the business role assignment can be deployed for the user assigned to the retrieved business role.

Specifically, the deployment of the business role assignment for the specified user can include the identification of the business role in block 345. In decision block 350, it can be determined whether the identified business role already had been considered. If so, in order to avoid the creation of a cyclical graph of nested business roles, no further action can be taken with respect to the identified business role in block 395 and the process can return to block 320 However, if the identified business role had not already been considered, in block 355, a role list can be retrieved for the identified business role. The role list not only can include a listing of application role assignments, but also the role list can include a listing of one or more nested business role assignments.

In block 360, a first entry in the role list can be retrieved for processing and in decision block 365, it can be determined if the first item is a nested business role assignment. If yes, in block 395 the business role assignment can be deployed for the user assigned to the retrieved role and the deployment process can be reprocessed beginning in block 345 for the user and the nested business role. Otherwise, in decision block 370 it can be determined if the first item is an application role assignment. If so, in block 375, the user can be assigned to the application role for a corresponding application. Subsequently, if in decision block 380 additional items remain to be processed in the role list, in block 385 a next item in the role list can be retrieved and processed through decision block 365.

When no further items in the role list remain to be processed, in block 350 the deployment of the business role assignment can complete and control can return to block 320. Returning to the deployment block 320, the deployment process can repeat for each additional role assignment listed in the access control policy in blocks 330 and 335. When no further application role assignments remain to be processed in decision block 330, in block 390, the policy deployment process can end.

Notably, the architecture apparent from FIG. 2 can enjoy a number of varying implementations. Referring to FIG. 2, in a deployment tool implementation, as the applications 270 are deployed, the deployment tools for the application containers 260 can load the application role definitions and initial application role assignments into the corresponding containers 260. Subsequently, the policy deployment logic 230 can evaluate the inherited application role assignments for the business role assignments and automatically can create and populate the required application role assignments in corresponding ones of the application containers 260.

By comparison, in a manager based implementation, an application manager can provide two secured interfaces for business role composition and business role assignments in the policy store 240. A solution integrator, in turn, can build the business role descriptors using the business role builder/editor 220, and a security administrator can build business role assignments in the access policy management console 210. In the manager based implementation, the policy store 240 and policy deployment logic 230 can be disposed in an aggregate access control manager, whereas in the deployment tool implementation, the policy store 240 and policy deployment logic 230 can be disposed in a deployment tool.

Notably, when one or more of the application containers 260 are configured to use an external enterprise authorization server 280 for access decision making, the application containers 260 can propagate the access policy updates provided by the policy deployment logic 230 to the external authorization server 280. As an alternative, in an enterprise authorization server implementation, the policy store 240 and the policy deployment logic 230 can be disposed in the external authorization server 280. In consequence, the business role definitions and assignments can be centrally maintained together with the application role policies in the external authorization server 280 rather than in an aggregate access control manager or in a policy deployment tool.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A data processing system for role-based access control management for multiple heterogeneous application components comprising:
    a processor,
    at least one business role descriptor associating a business role with a plurality of different application roles, identified within a role list, for corresponding, disparate application components;
    at least one access control policy associating a user with said business role; and,
    policy deployment logic executing on the processor and configured to
        process said access control policy to assign said user to said different application roles in said disparate application components,
        identify, within said role list, a nested business role associated with said business role and
        assign said user to additional application roles associated with said nested business role.

2. The data processing system of claim 1, further comprising
    an access control policy management console configured to create and edit said access control policy.

3. The data processing system of claim 1, further comprising a business role/builder editor configured to create and edit said business role descriptor.

4. The data processing system of claim 1, further comprising an external authorization server coupled to said disparate application components.

5. The data processing system of claim 4, wherein said policy deployment logic is disposed in said external authorization server.

6. The data processing system of claim 1, wherein said policy deployment logic is disposed in a deployment tool.

7. The data processing system of claim 1, wherein said policy deployment logic is disposed in an aggregate access control manager.

8. A method, within a data processing hardware system, for role-based access control management for multiple heterogeneous application components comprising:
    identifying a business role assigned to a user within an access control policy;
    identifying within a role list a plurality of application roles associated with said business role from a business role descriptor;
    assigning, within said data processing hardware system, said user to said application roles for each of a plurality of corresponding, disparate application components;

identifying within said role list a nested business role associated with said business role; and assigning said user to additional application roles associated with said nested business role for each of a plurality of corresponding, disparate application components.

9. The method of claim 8, further comprising propagating said application roles for each of said plurality of corresponding, disparate application components to an external authorization server.

10. A computer program product comprising a computer usable storage medium having computer usable program code, stored thereon, for role-based access control management for multiple heterogeneous application components, said computer program product including computer usable program code for causing a computer system to perform:

identifying a business role assigned to a user within an access control policy;

identifying within a role list a plurality of application roles associated with said business role from a business role descriptor;

assigning said user to said application roles for each of a plurality of corresponding, disparate application components;

identifying within said role list a nested business role associated with said business role; and assigning said user to additional application roles associated with said nested business role for each of a plurality of corresponding, disparate application components.

11. The computer program product of claim 10, further comprising propagating said application roles for each of said plurality of corresponding, disparate application components to an external authorization server.

* * * * *